United States Patent
Younes

(10) Patent No.: US 6,458,861 B1
(45) Date of Patent: Oct. 1, 2002

(54) CARBON DIOXIDE BLOWN LOW DENSITY, FLEXIBLE MICROCELLULAR ELASTOMERS SUITABLE FOR PREPARING SHOE COMPONENTS

(75) Inventor: Usama E. Younes, West Chester, PA (US)

(73) Assignee: Bayer Antwerp N.V., Antwerp (BE)

( * ) Notice: Subject to any disclaimer, the term of this patent is extended or adjusted under 35 U.S.C. 154(b) by 8 days.

(21) Appl. No.: 09/764,682

(22) Filed: Jan. 18, 2001

(51) Int. Cl.$^7$ ............................................. C08G 18/08
(52) U.S. Cl. ...................... 521/130; 521/122; 521/170; 521/174
(58) Field of Search ................................ 521/130, 170; 21/174, 122

(56) References Cited

U.S. PATENT DOCUMENTS

| | | | |
|---|---|---|---|
| 4,906,672 A | * 3/1990 | Stone et al. ............... | 264/50 |
| 5,120,770 A | 6/1992 | Doyle et al. | |
| 5,403,088 A | * 4/1995 | Killmer et al. ............. | 366/102 |
| 5,500,450 A | * 3/1996 | Simandl et al. ............ | 521/141 |
| 6,127,442 A | 10/2000 | Sulzbach et al. | |

* cited by examiner

*Primary Examiner*—John M. Cooney, Jr.
(74) *Attorney, Agent, or Firm*—Brooks & Kushman P.C.

(57) ABSTRACT

Microcellular polyurethane flexible foams suitable for use as lightweight shoe sole components are produced by dissolving carbon dioxide into one or both of the iso-side or resin-side of an isocyanate-prepolymer-based microcellular polyurethane foam formulation. The resultant foams possess more uniform cell structure and enhanced physical properties as compared to all water-blown foams of the same basic formulation and density. The hardness of the foams is more suitable for shoe sole, particularly midsole applications, than that of the water-blown foams, despite the lower urea hard segment content of the $CO_2$ blown foams.

20 Claims, 1 Drawing Sheet

CARBON DIOXIDE BLOWN LOW DENSITY, FLEXIBLE MICROCELLULAR ELASTOMERS SUITABLE FOR PREPARING SHOE COMPONENTS

TECHNICAL FIELD

The present invention pertains to low density, flexible microcellular elastomers suitable, inter alia, for the preparation of molded shoe soles, inners, and midsoles.

BACKGROUND ART

Cushioned soles for footware, particularly athletic footware are generally prepared from EVA (ethylenevinylacetate) microcellular foams. The processing of such foams is not straightforward, and the foams themselves do not have optimal properties. However, such foams continue to be used due to their availability in the very low density range, i.e., 0.1 g/cm$^3$ to 0.35 g/cm$^3$.

Polyurethane polymers generally exhibit physical properties which are superior to EVA polymers. However, numerous difficulties arise when attempts are made to mold polyurethane microcellular foams at low densities. Due to the hardness required for the end use, considerable amounts of low molecular weight chain extenders are required. In prior microcellular foams which are water-blown, the urea short segments which are created cause the formulations to have poor processability, resulting in both shrinkage and splits in the parts. The physical properties are also comprised, particularly when the superior properties of otherwise similar noncellular polymers are considered. These problems have prevented use of low density (<0.75 g/cm$^3$) polyurethane microcellular foams, and more particularly, very low density (<0.35 g/cm$^3$) polyurethane microcellular foams.

DISCLOSURE OF INVENTION

It has been surprisingly discovered that low density, and particularly very low density, polyurethane flexible microcellular elastomers may be prepared if the major portion of the water blowing agent is replaced by dissolved $CO_2$. Polyurethanes produced in this manner from ultra-low unsaturation polyols exhibit mechanical properties, including relatively high hardness at low density, which makes them eminently suitable for use in shoe sole components. Yet more surprising, polyester polyol-based microcellular, flexible polyurethane elastomers may be easily produced, even though their production as water-blown microcellular foams was exceptionally difficult.

BEST MODE FOR CARRYING OUT THE INVENTION

Figure 1:
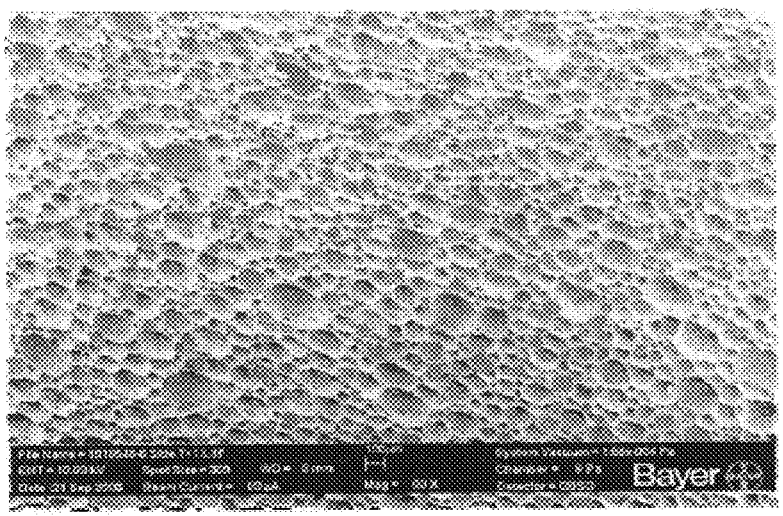
FIG. 1 illustrates the cell structure of a water-blown microcellular foam.
Figure 2:
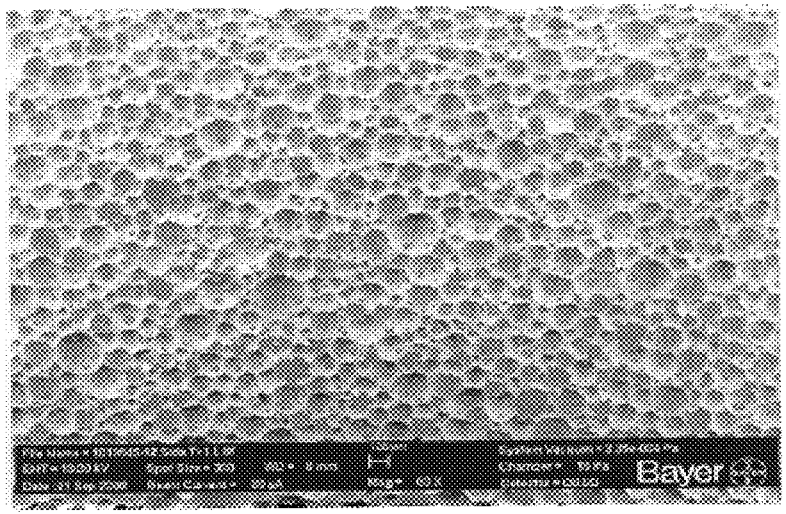
FIG. 2 illustrates the more uniform cell structure achieved in polyurethane microcellular foams when carbon dioxide is introduced into at least one of the reactive components.

The subject invention flexible microcellular foams have densities of about 0.75 g/cm$^3$ or below. These microcellular foams are elastomeric, or "rubbery" and should not be confused with microcellular rigid and semi-rigid foams produced by the high pressure RIM (reaction injection molding) process and commonly used for car parts such as fenders, bumpers, and fascias and the like. The microcellular flexible foams should also not be confused with conventional cellular flexible polyurethane foams. The latter have a coarse cell structure which is clearly visible by inspection with the naked eye, whereas microcellular foams have exceptionally small cells with an average cell size below 200 µm, and generally below 100 µm. The microcellularity is often observable only as an added "texture" to the microcellular polyurethane part unless microscopic means of examination are employed. Unlike microcellular foams, conventional polyurethane foams are routinely prepared at densities below 2 lb/ft$^3$ (0.17 g/cm$^3$) due to their larger cell size.

Microcellular polyurethane foams are prepared by reaction of an isocyanate component and an isocyanate-reactive component. In addition, various surfactants, catalysts, stabilizers, pigments, fillers, etc., my be present. All the foregoing ingredients are well known to those skilled in the art of flexible microcellular polyurethane elastomers. A blowing agent must also be present. The CFC blowing agents used for many years have been superceded, and water has now become the principle blowing agent for such foams. However, in the present invention, dissolved carbon dioxide or both dissolved carbon dioxide and minor amounts of water are used as the blowing agent.

The isocyanate component of the microcellular elastomer "system" or "formulation" generally comprises an isocyanate-terminated prepolymer in major part. Such prepolymers are well known, and are prepared by catalyzed or uncatalyzed reaction of a stoichiometric excess of di- or polyisocyanate such as 2,4-toluene diisocyanate (2,4-TDI), 4,4'-methylene diphenyl diisocyanate (4,4'-MDI), or modified MDI, with a polyol component. Other isocyanates can be used as well, including mixtures of isocyanates. The polyol component used in preparing the repolymers ordinarily has a functionality of between 2.0 an be greater or less. The isocyanate content, expressed as weight percent isocyanate groups, or "% NCO", may range from 3% to 24%, but is preferably in the range of 12% to 22%. The isocyanate content is most often 18–20% for shoe sole applications.

A single prepolymer or a mixture of prepolymers may be used. In addition, the isocyanate component may comprise "monomeric" isocyanates such as the various TDI isomers, the various MDI isomers, and modified isocyanates such as urethane, urea, allophanate, and particularly, carbodiimide-modified isocyanates, e.g., Mondur® CD available from Bayer. All these isocyanates are well known, and can be used in mixtures as well. Aliphatic isocyanates such as isophorone diisocyanate can also be used, but are not preferred. Mixtures of prepolymers and "monomeric" isocyanates may also be used. The isocyanate content in such cases, or where monomeric isocyanates alone are used, may be higher than 24%.

In preparing the prepolymers, conventional polyether or polyester polyols may be used, or low or ultra-low unsaturation polyether polyols may be used. The polyol functionality is generally 2 or 3, although higher functionalities may be used as well, particularly in minor quantities. Mixtures of lower and higher functionality polyols are sometimes advantageous. The functionality, as expressed herein, is the theoretical functionality based on the number of active hydrogens in the starter molecules from which the polyether or polyester polyols are prepared, i.e., for any given polyol the theoretical functionality will be a whole number. Mixtures of such polyols, for example polyols produced from a mixture of di- and tri-functional starters may result in a theoretical functionality which is intermediate between the starter functionalities. For example, a polyol produced from an equimolar mixture of ethylene glycol and glycerine will have a theoretical functionality of 2.5.

The theoretical functionality must be distinguished from the actual, or measured functionality, which will always, in the case of polyether polyols, be less than theoretical due to side reactions which occur during polyoxyalkylation. For example, a 3000 Dalton (Da) molecular weight polyether diol will have a theoretical functionality of 2. If conventionally prepared by base catalyzed oxyalkylation, the actual functionality may be 1.6, while if prepared using low unsaturation polyoxyalkylation techniques, the actual functionality may range from 1.85 to about 1.97.

The polyol component of the microcellular elastomer system comprises conventional polyether and/or polyester polyols of moderate to high molecular weight; chain extenders (functionality of 2); and crosslinkers (functionality higher than 2). Both chain extenders and crosslinkers are of low molecular weight, i.e., below 300 Da. Examples of crosslinkers include diethanolamine and triethanolamine. Examples of chain extenders include ethylene glycol, 1,2- and 1,3-propanediol, 1,4-butanediol, 1,6-hexanediol, diethylene glycol, dipropylene glycol, neopentyl glycol, and 2-methyl-1,3-propanediol.

Polyester polyols are well known, and are produced by condensation of a glycol and/or polyol with a dicarboxylic acid or esterifyable or tranesterifyable dicarboxylic acid derivative such as a lower alkanol ester or acid chloride. Examples of glycols and polyols useful include ethylene glycol, 1,2- and 1,3-propylene glycol, 1,4-butanediol, 1,6-hexanediol, cyclohexanedimethanol, 1,4-cyclohexanediol, glycerine, and the like. Suitable carboxylic acids or their derivatives include 1,4-butanedioic acid, glutaric acid, adipic acid, adipoyl chloride, azelaic acid, phthalic acid, isophthalic acid, terephthalic acid, dimethylterephthalate, and the like. Generally only minimal amounts of tri- or higher functionality monomers are employed so as to minimize viscosity.

The polyols useful, including both polyester and polyester polyols, preferably have molecular weights in the range of 500 to 10,000 Da, more preferably 1000 to 8000 Da, most preferably 2000 to 6000 Da if diols, and somewhat higher in each range if triols or tetrols. The overall average equivalent weight of the polyol component, not considering chain extenders or crosslinkers, is generally in the range of 1000 Da to 3000 Da, more preferably 1500 Da to 2000 Da. However, higher equivalent weight polyether polyols, particularly those having unsaturation below 0.020 meq/g are also useful. The average theoretical functionality generally lies between 1.5 and 4, more preferably between 2 and 3.

In addition to polyether and polyester polyols, "polymer polyols" may also be, and preferably are, employed. Polymer polyols are polyether or polyester base polyols which contain dispersed polymer particles, generally stably dispersed. While numerous polymer polyols are theoretically possible, and a variety are commercially available, the most dominant and preferred polymer polyols are those prepared by the in situ polymerization of unsaturated molecules in a base polyol, often with the aid of an unsaturated "macromer" polyol as well. The unsaturated monomers are most commonly acrylonitrile and styrene, and the acrylonitrile/styrene copolymer particles are preferably stably dispersed in amounts of 10 to 60% by weight based on total polymer polyol weight, more preferably 20 to 50%, and most preferably 30 to 45%. Such polymer polyols are available commercially, e.g., ARCOL® E850 polymer polyol containing 43% polyacrylonitrile/polystyrene solids available from Bayer.

It has been unexpectedly discovered that the $CO_2$-blown microcellular elastomers of the subject invention prepared from low or ultra-low unsaturation polyols, i.e., those having levels of unsaturation below 0.20 meq/g polyol (low) and preferably below 0.010 meq/g polyol (ultra-low), exhibit high hardness at very low densities. Ultra-low unsaturation polyether polyols are available as Accuflex® and Acclaim® polyether polyols from Bayer, and have unsaturations in the range of 0.002 meq/g to 0.007 meq/g. These are particularly preferred. By "high hardness" is meant high relative hardness as compared to a conventionally blown (CFC-blown) foam of similar density. While the inventive very low density foams have high relative hardness, the foams have hardness considerably lower than their water-blown analogs. The hardness of the latter, particularly at low density, renders such microcellular foams unsuitable for shoe sole applications.

The hardness range of the subject invention microcellular foams is preferably suitable for use in shoe soles, particularly midsole applications. Preferably, the hardness is at least 60 when part density is about 0.50 $g/cm^3$ or less, and at least 20 at densities of 0.35 $g/cm^3$ or less. The "hardness" is the Asker C hardness. High hardness foams, for example those with hardness of 75 or more on the Asker C scale are preferably avoided for midsole applications.

Additives which may be added to the microcellular elastomer formulations are well known. A surfactant suitable for maintaining stability of the exceptionally fine cells is generally required, e.g., Dabco® SC5980, a silicone surfactant available from Air Products Co. Other surfactants are well known to those skilled in the art. Fillers, e.g., fumed or precipitated silica, quartz flour, diatomaceous earth, precipitated or ground calcium carbonate, alumina trihydrate, titanium dioxide, and the like are also well known, as are dyes, pigments, ultraviolet stabilizers, oxidative stabilizers, and the like.

The microcellular formulations of the present invention are catalyzed. Conventional polyurethane catalysts may be used. When water is used for a portion of the blowing, a catalyst which catalyzes the isocyanate/water reaction should also be present. Examples of suitable polyurethane catalysts include the various tin catalysts, particularly tin octoate, dibutyltin diacetate, and dibutyltin dilaurate, and dimethyltin dimercaptide, bismuth catalysts, and tertiary amine catalysts such as Dabco® 1027 from Air Products. Some catalysts are capable of catalyzing both the urethane reaction as well as the isocyanate/water reaction. In such cases, only one catalyst is necessary even when water is employed.

The reactive elastomer formulations are generally formulated at isocyanate indices of 90 to 120, preferably 95 to 105, and most preferably about 100. The formulation of the reactants, including selection of isocyanates, polyols, catalysts, fillers, surfactants, etc., is well known to those skilled in the art.

The microcellular elastomers are predominately blown with gaseous carbon dioxide which is not introduced as a gas or liquid into the mix head, but is dissolved as a gas under pressure into at least one of the isocyanate or polyol (resin) components. Preferably, carbon dioxide is dissolved into both components, and most preferably is used as the sole blowing agent.

The carbon dioxide is introduced at modest pressure into the respective component storage tanks of the foam machine, and given sufficient time to dissolve to the extent necessary. The amount dissolved may be measured by any convenient technique, including relative rates of diffusion through a membrane detector. The amount dissolved may range from 0.05 g/L to 3 g/L, preferably 0.5 g/L to 2 g/L, and more preferably 0.8 g/L to about 1.5 g/L. The higher the amount of dissolved $CO_2$, the lower the component density. The carbon dioxide may be conveniently fed to the storage tank at 50 lb/in$^2$ pressure, for a time sufficient to dissolve the desired amount of carbon dioxide. Unless specified otherwise in the claims, the amount of dissolved $CO_2$ is the average concentrations in g/L based on the amounts of the isocyanate (iso) and polyol (resin) components. The $CO_2$ concentration may be conveniently measured with a Rosemount Analytical Inc. D-C02 Analyzer.

The two or more reactant streams, generally one polyol (resin) stream and one isocyanate (iso) stream may be combined by any suitable method for preparation of microcellular elastomers, including low pressure and high pressure heads. A low pressure shoesole molding machine (i.e., Desma RGE 395) may be advantageously used. It is necessary, when practicing the subject invention, that the resin and/or iso side(s) already contain dissolved $CO_2$. Adding $CO_2$ only at the mix head or in a frother (i.e., a Oakes mixer)will not produce acceptable elastomers.

The benefits of the subject process are that considerable reduction of chain extender is possible when producing low density microcellular elastomers, thus enlarging the processing window and reducing splits and shrinkage. In addition, water may be substantially or wholly eliminated, thus decreasing the quantity of urea groups produced. Preferably, the subject process employs less than 50% by weight of the amount of water which would produce a microcellular foam of the same density without $CO_2$ blowing agent. Most preferably the subject process employs less than 30% of this amount, and more preferably less than 20% of this amount. Less than 10% of the above amount of water is very advantageous, with the best results achieved with no added water. At the same time, $CO_2$ must provide minimally 50% of the blowing. Despite the avoidance of water, and thus also the urea "hard" segments produced in the water-blowing reaction with isocyanate, the subject elastomers are actually harder than elastomers of the same density produced with CFCs as the blowing agent when low unsaturation polyols are used. This high hardness is completely surprising and unexpected. However, the hardness at very low density is in the range suitable for use in shoe sole components, while all-water blown microcellular foams have unacceptably high hardness.

Having generally described this invention, a further understanding can be obtained by reference to certain specific examples which are provided herein for purposes of illustration only and are not intended to be limiting unless otherwise specified.

EXAMPLES 1–3

The isocyanate tank of a low pressure shoesole molding machine (Manufactured by Desma) was charged with about 18.7 kg of a 20% free NCO prepolymer which was made from 6.8 kg Accuflex® 1331 polyol, a 3000 Dalton (Da) diol with an unsaturation of 0.003 meq/g and an OH number of 37.5; 10.9 kg Mondur® M, 4,4'-MDI manufactured by Bayer Corporation; and 940 g Mondur® CD, a Carbodiimide-modified MDI from Bayer. The reaction was catalyzed with 2.7 g of Coscat® AF16, a bismuth catalyst manufactured by Caschem.

The polyol Tank was charged with 18.2 kg of a polyol mixture consisting of 3.53 kg Arcol® E850, a polymer polyol containing 43% polyacrylonitrile/polystyrene as a dispersed phase; 9.64 kg Acclaim® 4220 polyol, an ethylene oxide-capped, low unsaturation diol with an OH number of 28 and an unsaturation of 0.007 meq/g; 2.89 kg of Acclaim® 6320 polyol, an ethylene oxide-capped polyether triol with an OH number of 28 and an unsaturation of 0.007 meq/g; 773 g of 1,4 butanediol and 1383 g of ethylene glycol as the chain extender; 241 g of Dabco® EG, an amine catalyst from Air Products; and 120 g Dabco® 120, a dibutyl tin dimercaptide from Air Products.

Varying amounts of $CO_2$ were dissolved separately in the two components under 50 psig pressure. The actual amount of $CO_2$ was determined by measurement employing a Rosemount Analytical, Inc. D-CO2 Analyzer. The desired density of the final elastomer determined the amount of $CO_2$ that was allowed to dissolve.

The following examples show the various microcellular elastomers that were made from different amounts of $CO_2$ dissolved separately into the two components:

Example 1

In the above formulation 1.0 g/l of $CO_2$ was dissolved in the prepolymer side and 0.1 g/l $CO_2$ was dissolved in the polyol side. The tanks were maintained at 50 psi and 35 degrees ° C. This resulted in foam densities of the separate components at atmospheric pressure of 0.52 and 0.95 g1cm$^3$ respectively. The two components were mixed at a ratio of 0.84 using a low pressure machine and the material allowed to flow and expand into a 10 mm thick mold.

Example 2

In the above formulation 1.4 g/l of $CO_2$ was dissolved in the prepolymer side and 0.95 g/l $CO_2$ was dissolved in the polyol side. The tanks were maintained at 50 psi and 35 degrees ° C. This resulted in individual foam densities at atmospheric pressure of 0.31 and 0.51 g/cm$^3$ respectively. The two components were mixed at a ratio of 0.84 using a low pressure machine and the material allowed to flow and expand into a 10 mm thick mold.

Example 3

In the above formulation 1.5 g/l of $CO_2$ was dissolved in the prepolymer side and 1.25 g/l $CO_2$ was dissolved in the polyol side. The tanks were maintained at 50 psi and 35 degrees ° C. This resulted in foam densities at atmospheric pressure of 0.25 and 0.37 g/cm$^3$ respectively. The two components were mixed at a ratio of 0.84 using a low pressure machine and the material allowed to flow and expand into a 10 mm thick mold.

The properties obtained from these examples are compared in the following table:

TABLE 1

|  | Example 1 | Example 2 | Example 3 |
| --- | --- | --- | --- |
| Part Density, g/cm$^3$ | 0.64 | 0.43 | 0.23 |
| Hardness, Asker C | 82 | 69 | 36 |
| Tensile Str. Kg/cm$^2$ | 56 | 30 | 10 |
| Split Tear, kg/cm | 4.9 | 3.0 | 1.8 |
| C Tear, kg/cm | 19.6 | 11.7 | 6.2 |
| Resilience | 42 | 41 | 37 |

As can be seen, the subject invention process produces elastomers with high hardness values. Even at an ultra-low density of about 0.23 g/cm³, the hardness is still 36 on the Asker C scale, and the resilience quite high as well, nearly as high as a part with three times the density. Such physical properties have not previously been obtained at such low density.

Example 4 and Comparative Example C1

The following are examples of microcellular elastomers with $CO_2$ and water in combination as the blowing agent, accomplished by dissolving $CO_2$ in the polyol side of the formulation also containing a small amount of water. The addition of $CO_2$ into this formulation results in improved properties and cell regulation than elastomers which are made with water alone as the blowing agent.

The isocyanate tank of a low pressure shoesole molding machine (Manufactured by Desma) was charged with about 18.6 kg of a 20% free NCO prepolymer which was made from 3.8 kg Acclaim® 4220 polyol, an ethylene oxide-capped low unsaturation diol with an OH number of 28 and an unsaturation of 0.007 meq/g; 12.6 kg Mondur® M 4,4'-MDI, manufactured by Bayer Corporation; 1.1 kg Mondur® CD, a carbodiimide modified MDI from Bayer, and 1.1 kg of dipropylene glycol. The reaction was catalyzed with 2.0 g of Coscat® AF16, a bismuth catalyst manufactured by Caschem.

The polyol Tank was charged with 18.4 kg of a polyol mixture consisting of 4.8 kg Arcol® E850, a polymer polyol containing 43% polyacrylonitrile/polystyrene solids; 10.2 kg Acclaim® 4220 polyol, an ethylene oxide- capped low unsaturation diol with an OH number of 28 and an unsaturation of 0.007 meq/g; 880 g of Acclaim® 6320, an ethylene oxide-capped polyether triol with an OH number of 28 and an unsaturation of 0.007 meq/g; 2.1 kg of ethylene glycol as the chain extender; 247 g water; 64 g of Dabco® EG, an amine Catalyst from Air Products; 48 g of Dabco® 1027 EG, amine Catalyst from Air Products; 3 g of UL-32, a dimethyl tin dimercaptide catalyst from Witco; and 159 g of Dabco® SC5980, a surfactant from Air Products.

Comparative Example C1

In the above formulation no $CO_2$ was dissolved in either the prepolymer or the polyol side. The two components were then mixed at a ratio of 1.2 (100 Index) using a low pressure machine and the material allowed to flow into a 10 mm thick mold.

Example 4

In the above formulation 1.6 g/l of $CO_2$ was dissolved in the polyol side. The tanks were maintained at 50 psi and 35 degrees C. This resulted in a polyol foam density at atmospheric pressure of 0.2 g/cm³. The two components were then mixed at a ratio of 0.84 using a low pressure machine and the material allowed to flow into a 10mm thick mold.

The properties obtained from these examples are compared in the following table:

TABLE 2

|  | Comparative Example C1 | Example 4 |
|---|---|---|
| Hardness, Asker C | 67 | 72 |
| Tensile Str. Kg/cm2 | 14 | 16 |
| Split Tear, kg/cm | 1.4 | 2.1 |
| Resilience | 24 | 24 |

Example 4 and Comparative Example 1 illustrate that by replacing a portion of water blowing agent with $CO_2$, physical properties are noticeably increased, while hardness remains about the same. The increase in tensile strength (14% increase) and split tear (50% increase) are noteworthy. However, even more noteworthy is the fact that the cell morphology of the microcellular foam produced with no dissolved $CO_2$ was poor, exhibited significant shrinkage, and had poor surface quality.

Examples 5 and Comparative Examples 2 and 3

A microcellular foam formulation was prepared as in the prior Examples. One formulation, Example 5, contained both water and dissolved $CO_2$ as blowing agents. The second formulation (Comparative Example C2) had an amount of water sufficient to produce a foam of the same density. The formulations and physical properties are given below. All parts are parts by weight.

TABLE 3

| Example | 5 | C2 |
|---|---|---|
| Acclaim ® 4220 polyol[1] | 28 pph | 28 pph |
| Acclaim ® 6320 polyol[2] | 28 | 28 |
| Water | 1 | 3 |
| $CO_2$ | 1.2 | 0 |
| Ethylene Glycol | 13.8 | 13.8 |
| Dabco ® EG | 0.4 | 0.4 |
| Dabco ® 1027 | 0.3 | 0.3 |
| UL-32 | 0.02 | 0.02 |
| DC-5980 surfactant | 1 | 1 |
| Density, g/cm³ | 0.2 | 0.2 |
| Hardness, Asker C | 62 | 82 |
| Foam Properties: | No shrinkage | Shrinkage |
|  | Good surface | Poor surface |
|  | Uniform cells | Distorted cells |

[1]Acclaim ® 4220 polyol is a nominal 2000 equivalent weight, ultra-low unsaturation polyoxypropylene, diol containing copolymerized oxyethylene moieties, available from Bayer.
[2]Acclaim ® 6320 polyol is a nominal 2000 equivalent weight ultra-low unsaturation polyoxyalkylene triol containing copolymerized oxyethylene moieties available from Bayer.

The microcellular foam employing both water and carbon dioxide as blowing agents produced a good quality microcellular part with good surface, uniform cells, and substantially no shrinkage. The all water-blown foam produced significant shrinkage, had a poor surface, and a morphology characterized by distorted cells. The latter elastomer was too hard for midsole applications. An attempt was made to produce a softer elastomer (Comparative Example) in an all-water-blown formulation by decreasing the chain extender amount to 9.2 parts.

However, severe shrinkage occurred, and the part was not suitable for testing. At low densities, production of microcellular elastomers for shoe sole applications requires the use of dissolved $CO_2$.

Example 6

Polyester-based polyurethane flexible microcellular foams are prepared in a manner similar to Example 4, but employing polyester polyols and a polyester-based MDI prepolymer.

TABLE 4

| Witco 2456 polyester diol polyol | 70 parts |
|---|---|
| Witco F53 polyester triol polyol | 30 parts |
| Ethylene glycol | 8 parts |
| Niax L-5614 surfactant | 1 part |
| DABCO ® catalyst | 0.5 parts |

TABLE 4-continued

| | |
|---|---|
| Pigments, antioxidant | 1.5 parts |
| UV absorber, W stabilizer | 1.5 |
| Carbon dioxide | variable |
| Water | 0 to 2 |

The above composition is reacted with a polyester MDI prepolymer such as Mondur® E501 from Bayer. The resulting foam has a density of less than 0.3 g/cm$^3$ with improved dimensional stability and mechanical properties. Ordinarily, low density polyester based polyurethanes are difficult to foam. Water and/or CFC-blown polyester foams generally exhibit poor flowability and are dimensionally unstable. Use of dissolved carbon dioxide as a blowing agent unexpectedly solves both these problems.

Having now fully described the invention, it will be apparent to one of ordinary skill in the art that many changes and modifications can be made thereto without departing from the spirit or scope of the invention as set forth herein. The terms " a" and "an" m when used in the claims, mean "one or more" unless otherwise indicated. The terms "major" and majority" mean 50% or more on a weight or mol basis as the case may be.

What is claimed is:

1. A process for the preparation of microcellular flexible polyurethane foam having a density of less than 0.75 g/cm$^3$, comprising:
   A) providing a reactive mixture comprising
      1) an isocyanate-functional component;
      2) an isocyanate-reactive component comprising
         2a) at least one hydroxyl-functional polyol having a theoretical functionality between 2 and 4;
         2b) optionally a chain extender having a molecular weight below 300 Da;
         2c) optionally a crosslinker having a molecular weight below 300 Da;
      3) a urethane promoting catalyst and optionally, if water is also present, a catalyst for the isocyanate-water blowing reaction;
      4) a surfactant effective to form stable cells having an average diameter below 200 μm; and
   B) an amount of blowing agent suitable to form a microcellular polyurethane foam with a density between 0.1 g/cm$^3$ and 0.75 g/cm$^3$,
wherein said blowing agent comprises carbon dioxide which has been dissolved into said isocyanate-functional component A, said isocyanate-reactive component B, or both component A and component B, and optionally a minor amount of water, said minor amount of water being less than 50% by weight of the amount of water required to produce an all-water-blown microcellular elastomer of the same density from the same formulation not containing dissolved CO$_2$.

2. The process of claim 1, in which no water is added as a blowing agent.

3. The process of claim 1, where at least one polyol is a low unsaturation polyether polyol with a molecular weight greater than 2000 Da and an unsaturation less than 0.020 meq/g.

4. The process of claim 1, wherein all polyoxyalkylene polyols employed as polyols which have equivalent weights greater than about 1000 Da are low unsaturation polyols having an unsaturation less than 0.020 meq/g.

5. The process of claim 1, wherein said microcellular foam has a density of less than 0.50 g/cm$^3$ and a hardness of at least 60 on the Asker C scale.

6. The process of claim 1, wherein said microcellular foam has a density of less than 0.35 g/cm$^3$ and has a hardness of at least 20 on the Asker C scale.

7. The process of claim 1 wherein greater than 50% by weight of the total weight of all polyols in component 2) are polyester polyols.

8. The process of claim 7, wherein said microcellular foam has a density below 0.35 g/cm$^3$ and a hardness on the Asker C scale of greater than 60.

9. The process of claim 1 wherein all polyols employed are polyether polyols having an unsaturation of less than 0.010 meq/g.

10. A flexible, low density polyurethane microcellular foam having a density below 0.75 g/cm$^3$ and exhibiting a high cellular uniformity, prepared by reacting an isocyanate component and an isocyanate-reactive component in the presence of a urethane reaction-promoting catalyst and a cell stabilizing surfactant; wherein the cell structure of said microcellular foam is characterized by a uniform cell structure of cells having an average diameter of less than 200 μm; said cells filled with carbon dioxide gas, the major portion of which is not derived from an isocyanate/water blowing reaction, nor delivered at a mix head employed to mix said isocyanate component and said isocyanate-reactive component, but is derived from carbon dioxide dissolved in one or more of the isocyanate component or the isocyanate-reactive component.

11. The microcellular foam of claim 10 wherein the average cell diameter is less than 100 μm.

12. The microcellular foam of claim 10 which has a density of less than 0.50 g/cm$^3$ and a hardness on the Asker C scale of greater than 60.

13. The microcellular foam of claim 10 wherein said isocyanate-reactive component comprises at least one low unsaturation polyether polyol having an equivalent weight greater than 1000 Da and an unsaturation of less than 0.020 meq/g.

14. The microcellular foam of claim 10 wherein polyether polyols are employed in said isocyanate-reactive component, and all polyether polyols have an unsaturation of less than 0.010 meq/g when the equivalent weight of said polyether polyol is higher than 1000 Da.

15. The microcellular foam of claim 10 wherein said isocyanate-reactive component comprises at least one polymer polyol.

16. The microcellular foam of claim 14 wherein said isocyanate-reactive component comprises at least one polymer polyol.

17. The microcellular foam of claim 10 wherein said isocyanate-reactive component comprises a polyester polyol and the hardness of said microcellular foam is greater than 60 on the Asker C scale.

18. A shoe sole component comprising the microcellular foam of claim 1.

19. A shoe sole component comprising the microcellular foam of claim 10.

20. A shoe sole component comprising the microcellular foam prepared by the process of claim 14.

* * * * *